Aug. 13, 1968  O. P. DOHMS ET AL  3,396,486
ANIMAL TRAP
Filed Nov. 5, 1965  2 Sheets-Sheet 2
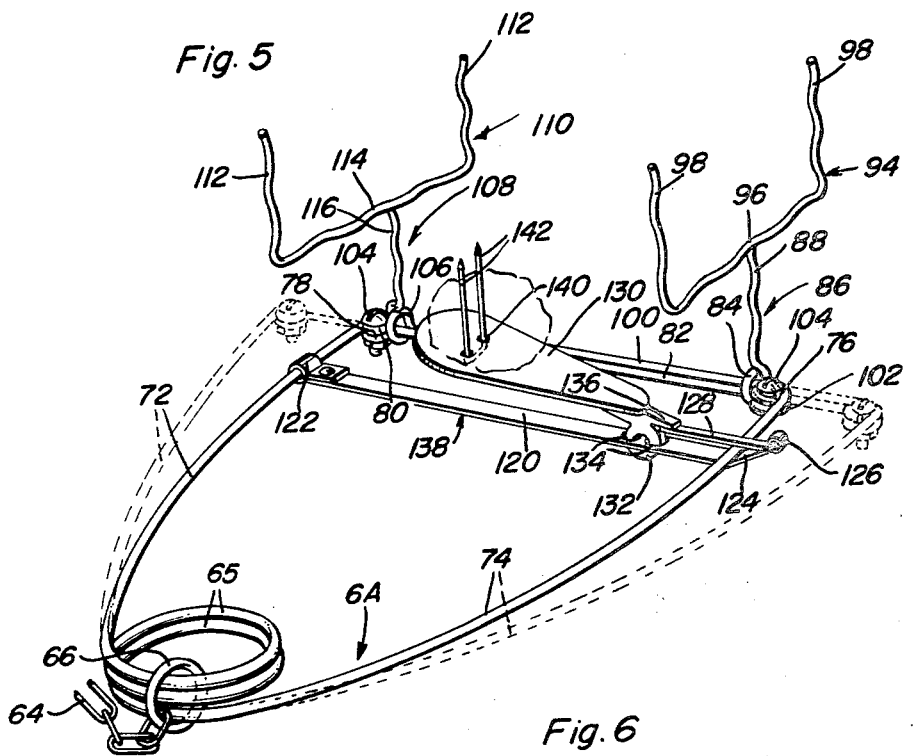
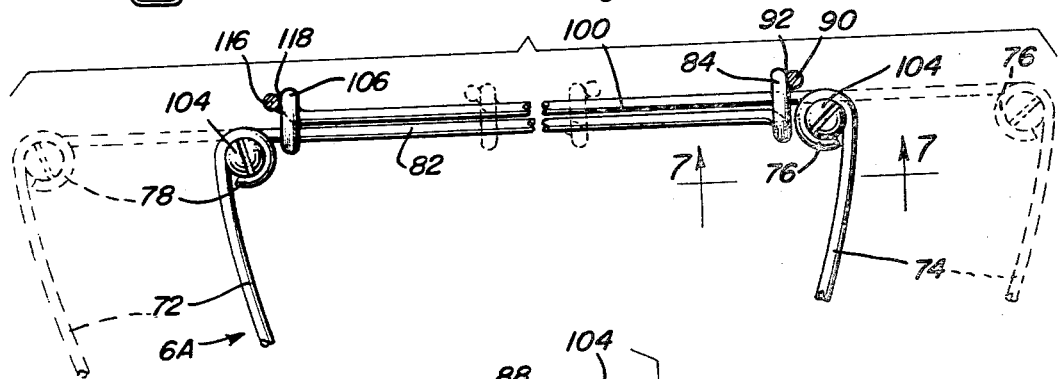
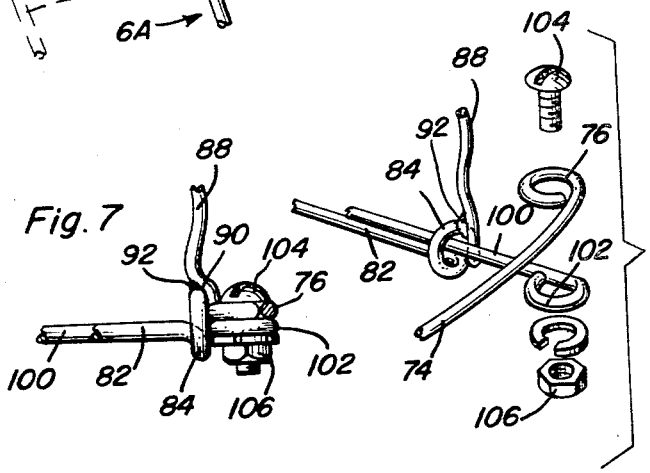
Otto P. Dohms
Myron Updike
INVENTORS

United States Patent Office 3,396,486
Patented Aug. 13, 1968

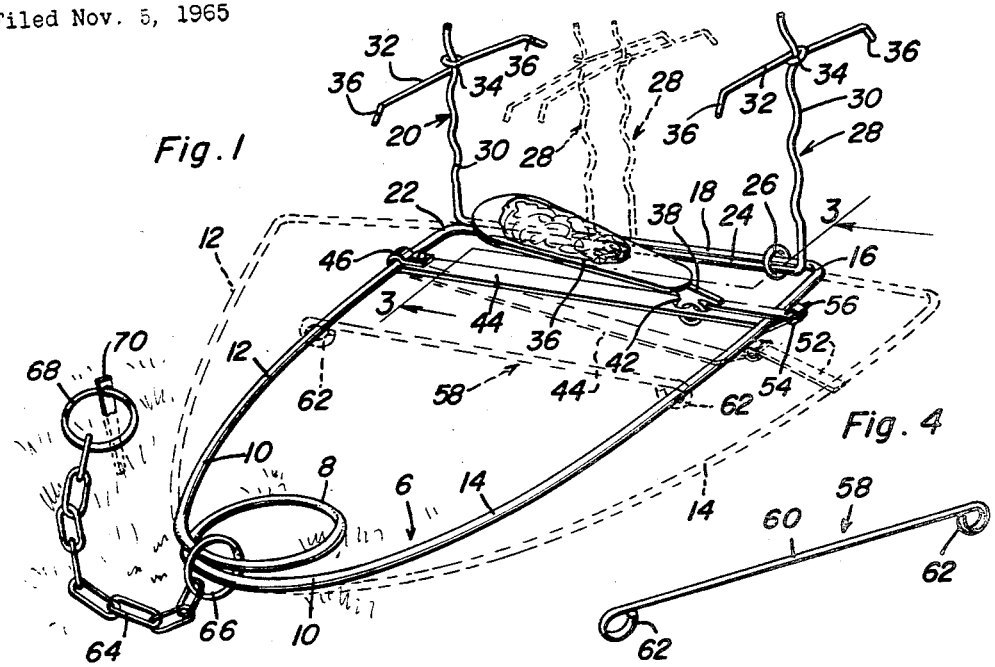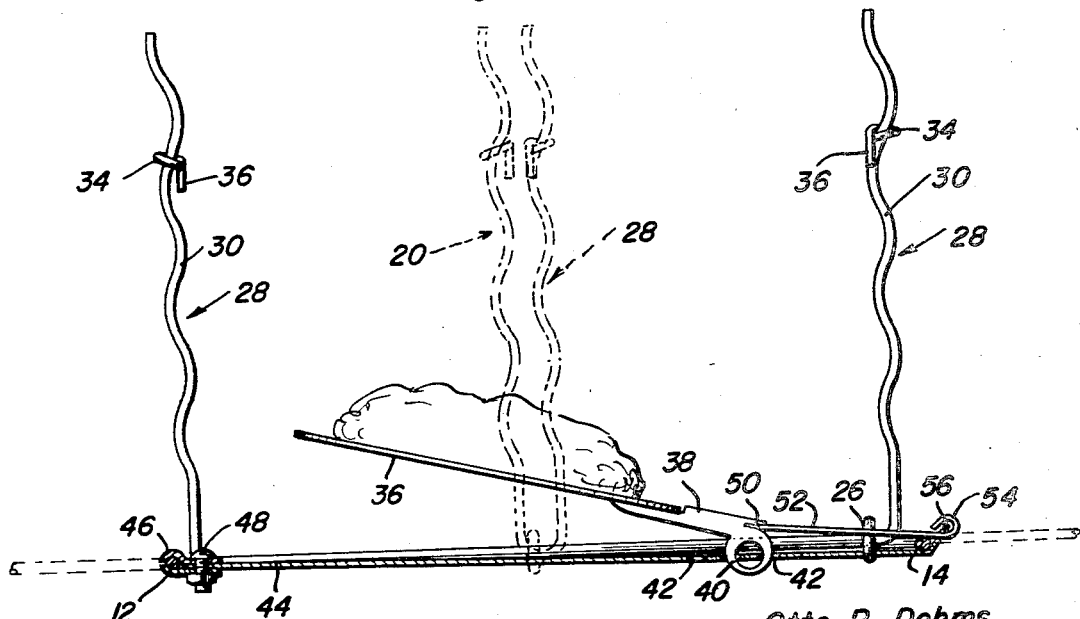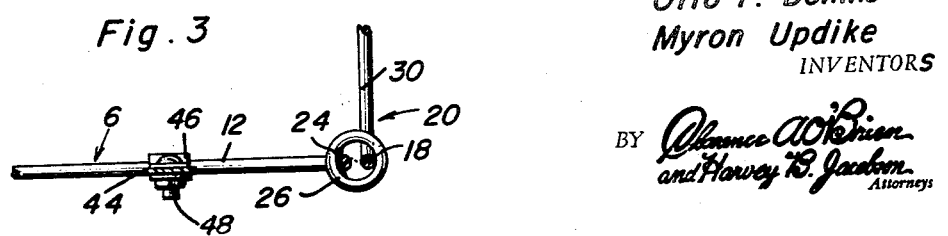

3,396,486
ANIMAL TRAP
Otto P. Dohms, R.F.D. 1, Harrietta, Mich. 49638, and
Myron Updike, 117 Henry St., Mesick, Mich. 49668
Continuation-in-part of application Ser. No. 455,882,
May 14, 1965. This application Nov. 5, 1965, Ser.
No. 511,281
6 Claims. (Cl. 43—90)

ABSTRACT OF THE DISCLOSURE

A spring steel rod is bent to provide a trap frame having expansible and contractable limbs joined at like ends by coil spring means. The other ends of these limbs are slidingly linked and have integrated upstanding jaws such that when tripped move together and squeeze the trapped animal. These jaws have opposed strikers to achieve the lethal blow desired. A latch-equipped bait pan serves to (1) set and (2) releasably trip the jaws.

---

The instant application for patent is a continuation-in-part of our copending application, Ser. No. 455,882, filed May 14, 1965, and now abandoned.

The herein disclosed invention relates to a portable spring-biased jaw trap expressly designed and structurally adapted to reliably trap and kill fur bearing animals such as, for example, beavers, otters, muskrats, mink and the like.

The improved trap embodies spring actuated jaws which are uniquely designed to bodily capture and clampingly squeeze the animal and are equipped with blow strikers which while achieving the lethal result do not damage the animal's pelt.

The improved trap makes the catch in a humane manner in that it does not act to trap the feet and torture the animal or result in inhumane wring-offs. This novel trap can be successfully set and used on land or in water. It is compact, light in weight, easy to camouflage when properly set for use in known animal run ways, can be anchored by passing a stake through a staking ring of the holddown chain and stays put in a horizontal use position. Further, it works excellently for hole sets or bait sets, as desired, has no objectionable tunneling or box-type enclosure facilities, makes the catch from either entrance approach and well serves the purposes for which it is intended.

Two forms or embodiments are herein shown, described and claimed. Briefly, each trap is characterized by an elongated frame which is such in construction and shape that it can be placed flatwise on a support surface in a body of water or on the land, as the case may be. This frame embodies a pair of limbs which are resilient, which can be contracted and latched in position but which are normally expansible. These limbs have like coacting ends which are interconnected by coil spring means the purpose of which is to assist in spreading the limbs apart. The other ends of the limbs have a pair of opposed upstanding jaws which in turn have the capability of grabbing and forcibly squeezing the potential victim. It is of significance in that the jaws are specially delineated in shape, are opposed and lined up, and of appropriate height that the horizontal impact members at the upper ends constitute strikers which forcibly land a lethal blow when the trap is sprung. To achieve the ends desired a bait pan (with or without prongs) is provided with a trigger and means is carried by adapter means on which the trigger is hingedly and thus operatively mounted to accommodate a manually set trigger released latch. This latch is pivotally mounted and has trippable engagement with the animal actuated trigger and pan.

It is of an advantage that the companion jaws are not only (1) T-shaped or (2) U-shaped but are straight up and perpendicular when in use and are without sharp points that would undesirably impale the animal. The vertical stem portions of the respective jaws can be corrugated or equivalently constructed to obtain a good grip on the captured animal. A horizontal crossbar is attached at one end to one limb of the trap frame to provide a satisfactory adapter or mounting for the trigger-equipped bait pan.

The pivoted trigger-equipped pan, the adapter or mounting bar therefor and latch means on the bar is of the same construction in both embodiments. Secondly, the basic U-shaped spring-loaded frame is generically the same in both embodiments. The upstanding grappling jaws are broadly similar but specifically distinguishable. On the other hand, the spreadable free ends of the limbs of the two frames (FIG. 1 as distinguished from FIG. 5) while functionally alike are structurally different as will be hereinafter clarified.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing an animal trap constructed in accordance with the present invention and also showing it set for use in full lines and how the component parts appear in relation to each other when the trap is sprung, this stage illustrated in phantom lines;

FIG. 2 is a cross-section on a larger scale;

FIG. 3 is a fragmentary view in section and elevation taken on the plane of the irregular section line 3—3 of FIG. 1; and FIG. 4 is a view in perspective of a safety setting and releasing guard which, while optional, is preferably provided;

FIG. 5 is a view in perspective showing a second embodiment of the trap;

FIG. 6 is an enlarged fragmentary plan view of the forward end of FIG. 5 with the component parts appearing in full and phantom lines respectively;

FIG. 7 is a detail view on section line 7—7 of FIG. 6; and

FIG. 8 is an exploded perspective view suitably enlarged to illustrate certain of the details.

Referring first to FIGS. 1–4 the frame is denoted by the numeral 6 and is preferably semi-elliptical or U-shaped in top or bottom plan and varies in size in keeping with the trapping requirements. This frame is preferably constructed from non-corrodible stainless spring steel rod stock of the approximate gauge shown. A single length of rod or stout wire is bent upon itself intermediate its ends to provide a centralized spring coil 8 which joins like end portions 10 of a pair of duplicate coplanar arms or limbs 12 and 14. One free end portion of the righthand limb 14 is laterally bent as at 16 where it extends at right angles and the full width of the trap when normally set. This end portion is denoted by the numeral 18 and terminates at the left in FIG. 1 in a first striker-type capturing jaw 20. The corresponding free end portion of the limb 12 is bent as at 22 and extends the full width or across the trap as at 24, the same being close to and parallel with the cooperating end portion 18. The end portion 24 is provided with a terminal assembling and stabilizing eye 26 which surrounds both end portions 18 and 24 at the right in FIG. 1. The end portion 24 terminates in an upstanding T-shaped grappling and striker type jaw 28. Each jaw 20 or 28 is the same in construction and preferably comprises a corrugated or correspondingly bent vertical stem 30 and a crosshead 32 which has an eye 34 intermediate its ends encircling and fixed to the upper end portion of the stem and also has downturned free end portions 36. These opposed upstanding T-type jaws have been found in practice to be effective in capturing the desired animals by grappling and squeezing the same. To this end the horizontal strikers 32 come into play and impart lethal blows which result in the death of the trapped animal.

The elongated bait pan 36 is fairly common in type. However, the pan is provided with a novel trigger 38 which is fixed to the righthand end of said pan and has an anchoring pivoting and adjusting ring 40 (see FIG. 2) which is connectible with holes 42 provided therefor, that is, holes provided in a pan adapter, a simple mounting bar or base. This base, more specifically comprises a rigid metal or equivalent strap or bar 44 which has its lefthand end portion provided with a suitable clip 46 which embraces the frame limb 12 and is bolted or otherwise secured thereto detachably and adjustably as denoted at 48 in FIG. 2. The righthand end portion of the trigger 38 is fashioned into an appropriate keeper 50 for an end portion of a simple latch 52 having a hooked end portion 54 pivotally connected to an upturned terminal end or flange 56 on the righthand end portion of the pan mounting bar 44.

The safety device which assists in setting the trap is denoted by the numeral 58 and comprises a simple rod 60 which is of a length to span the space between the arms 12 and 14 when the trap is set. The end portions are provided with eyes 62 which are slidably mounted on the respective arms or limbs 12 and 14. It follows that when one desires to compress the spring 8 and press the limbs 12 and 14 together sufficiently to set the trap this step is assisted by pushing on the guard rod 58 and shoving it from the coil end to the jaw ends. With the jaws together it is an easy matter to bait the pan and then angle the pan so that the trigger is in a proper position to allow the free end of the latch 52 to be engaged under the keeper and over the limb 14 to set the trap, as shown in full lines in FIGS. 1 and 2.

It will be clear that (assuming that the trap is set in the manner shown in FIG. 1) the two T-shaped jaw units 20 and 28 are in the full line position and relationship shown. When the animal treads or steps on and depresses the bait pan 36 to get at the bait it will be seen that as the pan rocks or pivots down on the hinging points 40 and 42 the trip latch 52 is released and the two arms 12 and 14 spring apart under the influence of the spring 8 and inherent resilient properties and move from the full line to the phantom line position in relationship shown in FIG. 1. When the trap is thus sprung the jaws come together and the trapped animal is not only forcibly embraced by the corrugated stems or upright portions of the jaws, the heavy blows which are struck by the headed upper ends function to grapple and kill the animal but without inhumane torture.

This trap is thus constructed and functions to catch and kill the animal and yet will not damage the fur or pelt. It does not merely catch the animal by the feet or result in the animal being partly caught and having to resort to gnawing and the practice known by the trappers as wring-offs. Experience has shown that a trap constructed as illustrated is successful in land or in water. It is easy to set and does not have to be staked out. If desired, a chain 64 can be provided, the same being connected with a ring 66 to the coil spring 8. The other free end is provided with a similar ring 68 having a stake thereon as at 70 which can be driven into the ground. The trap is quite easy to set and safe and does not have to be staked down except with the aid of a chain ring and stake illustrated. The trap is not easily tipped over as it is set flatwise on the ground. In practice the trigger can if desired be adjusted. Then, too, the trap can be easily camouflaged and used to advantage in runways such as are used by a beaver, otter, mink, muskrat or the like. It will be noted, too, that the trap is unobstructedly open on the main portion of the top and consequently the animal can be caught either way he enters the trap.

With reference now to the embodiment of the invention disclosed in FIGS. 5 to 8, inclusive, it will be obvious that many of the structural features are the same as are found in the embodiment disclosed in FIGS. 1 to 4, inclusive. With reference to FIG. 5 it will be noted that the frame 6A corresponds generally to the frame 6 in FIG. 1. More specifically it comprises a length of stout stainless steel resilient wire or equivalent rod stock which is bent upon itself intermediate its respective ends to provide a pair of like longitudinally bowed coplanar arms or limbs 72 and 74 at the left and right respectively, the like or corresponding ends at the left in FIG. 5 being interconnected by aligned superimposed spring coils 65 to which the ring 66 of the chain 64 (FIG. 1) is connected. The chain is the same as already described and will not be further described here. The arms 72 and 74 are connected together in a manner different from that shown in FIG. 1. To this end it will be seen that the arm 74 is provided at its forward free end with an assembling eye 76 (FIG. 8). The corresponding eye 78 (FIG. 5) is aligned with an assembling eye 80 at the lefthand end portion of a straight rigid link 82 which when assembled substantially spans the space between the eye-equipped ends of the limbs 72 and 74. This first link is provided at the righthand end with a suitable guide ring 84 which carries the cooperating jaw unit 86. This unit comprises a vertical corrugated wire or equivalent stem or upright 88 whose lower end portion 90 is welded at 92 to the ring 84. The upper end of the stem is connected to the striker head, more particularly the U-shaped striker head 94, that is the bight portion 96 thereof. The vertical ends of the striker head are denoted at 98. A second companion linearly straight link 100 terminates at its righthand end in an eye 102 which is aligned with the eye 76. These coacting eyes at both left and right ends of the limbs and links are assembled by way of a bolt 104 which passes therethrough and is held in place by a retaining nut 106. It is in this manner that the respective links 82 and 100 are pivotally connected to their respectively cooperable limbs 72 and 74 and are allowed to assume side-by-side parallel relationship in the manner shown. The second link 100 is outwardly or in front of the first link 82 and it is provided at its lefthand end with a link encircling guide ring or collar 106 which carries the jaw unit 108 at the left in FIG. 1. This jaw unit is the same as the unit 86 and comprises a U-shaped striker head 110 having upstanding end portions 112 with its bight portion 114 joined to the upper end of the vertical stem or upright 116 which in turn has its lower end welded at 118 to the guide collar or ring 106. Thus, instead of having integral lateral ends as at 18 and 24 in FIG. 1 with a single assembling eye 26 it will be noted here that there are individual assembling and connecting links which are side-by-side and are pivotally joined at their outer ends to eyes 76 and 78 provided therefor on the respective limbs 72 and 74. The second-named link 100 passes slidingly from right to left through the guide ring 84 and contrawise the first-named link 82 extends slidingly through the guide ring 106.

The bait pan and its mounting means is the same as that shown and described with respect to FIGS. 1 and 2. Briefly, it comprises a strap or bar member 120 which spans the space between the limbs and has its lefthand end 122 clipped and fastened to the limb 72. The other end portion is free of connection with the limb 74 and in fact extends beneath the same and is laterally bent as at 124 where it is provided with means 126 connecting a latch 128 thereto. The elongated ovate pan 130 has an end portion 132 hinged as at 134 to the bar, said end being provided with a trigger 136 with which the latch is engageable. The pan is arranged atop the bar designated generally as an adapter 138. If desired the pan may be provided with holes 140 to accommodate an optionally usable attachment comprising upstanding bait holding prongs 142.

The trap in FIG. 5 is shown set in full lines wherein it will be seen that the latch 128 is engaged with the trigger 136. When the pan 130 is depressed the limbs 72 and 74 spring apart as shown in phantom lines and cause the striker jaws to come together and to make the desired catch.

The features and advantages described in reference to the form of the invention shown in FIG. 1 are also attributed to the form of the invention disclosed in FIG. 5 and need not be repeated here.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal trap comprising a length of spring steel stout wire bent upon itself intermediate its ends and embodying complemental limbs having like ends joined by intervening coil springs means, the free forward ends of said limbs terminating in left and right assembling and connecting eyes, a first link lateral to one limb and having an eye at one end aligned with and detachably and pivotally joined to said left eye and provided at its other end with an integral right angularly positioned upstanding guide ring, a first jaw unit having a vertical stem affixed at its lower end to and rising perpendicularly from said guide ring and having a striker head affixed to its upper end, a second link like said first link and disposed in front of and alongside said first link and having an eye at one end aligned with and detachably and pivotally joined to said right eye and also provided at its other end with an integral right angularly disposed guide ring, a second jaw unit likewise having a vertical stem and affixed at its lower end to and rising perpendicularly from said last named guide ring and having a striker head affixed to its upper end, an adapter bar spanning said limbs and having one end anchored on one limb and its other end oriented with the opposed limb and provided with a pivoted latch, and a bait pan pivotally mounted atop a median portion of said bar and having a trigger with which said latch is releasably engageable.

2. The trap according to claim 1, and wherein said stems are corrugated and said striker heads are also corrugated and U-shaped in side elevation.

3. The trap according to claim 2, and wherein said links are rigid, longitudinally straight, are close together and are passed slidingly through their respectively cooperable guide rings, said adapter bar being spaced inwardly rearwardly from said links and being substantially parallel thereto.

4. An animal trap comprising a pair of companion opposed vertically upstanding animal capturing and death dealing jaws, a horizontally elongated spring-loaded frame providing a base, said base comprising a substantially semi-ellipical stout wire frame embodying a pair of longitudinally bowed companion limbs having like ends joined by a coil spring for biasing said limbs outwardly in opposite directions, said limbs having coplanar free end portions laterally directed and linked slidingly together, said jaws being connected to and carried by terminal ends of said free end portions, a bar member positioned between said limbs and having one end fastened to one of said limbs, said bar spanning the space between said limbs and having an upwardly turned other end passing beneath and projecting beyond the other limb, a latch having one end pivotally joined to the last-named other end of said bar, a bait pan having a trigger at one end hingedly and adjustably mounted atop one end portion of said bar member, said latch being adapted to cross over said other limb and having a free end portion releasably connectible with said trigger.

5. The structure according to claim 4, and wherein each jaw is T-shaped in side elevation and comprises a vertical corrugated stem and a horizontal corrugated crosshead in a plane at right angles to and joined intermediate its ends to an upper end portion of said stem, and having downturned terminal ends.

6. The structure according to claim 4, and wherein each jaw comprises a vertical corrugated upright provided at its upper end with a U-shaped corrugated striker head whose median bight portion is joined integrally to the upper end of said upright and is in a horizontal plane at right angles to the verticality of said upright.

References Cited

UNITED STATES PATENTS

| | | | |
|---|---|---|---|
| 778,777 | 12/1904 | Gates | 43—92 |
| 1,332,360 | 3/1920 | Roy | 43—88 |
| 1,377,441 | 5/1921 | Roy | 43—88 |
| 1,726,694 | 9/1929 | Cooper | 43—86 X |
| 2,394,032 | 2/1946 | Warren | 43—91 |

WARNER H. CAMP, *Primary Examiner.*